United States Patent Office 3,810,984
Patented May 14, 1974

3,810,984
ANTICESTODE HYDRAZINOQUINOLINES
Philip Paul Actor, Phoenixville, Pa., and Cesare Enrico Giuseppe Pellerano, Sienna, Italy; said Actor assignor to Smithkline Corporation, Philadelphia, Pa.
No Drawing. Original application Sept. 19, 1969, Ser. No. 859,593, now Patent No. 3,646,019. Divided and this application June 2, 1971, Ser. No. 149,340
Claims priority, application Italy, Oct. 26, 1968, 23,025/68
Int. Cl. A61k 27/00
U.S. Cl. 424—258         10 Claims

ABSTRACT OF THE DISCLOSURE

4 - (pyridylmethylenehydrazino)quinolines, optionally substituted with a 2-alkyl group and otherwise at the 6,7,8, or 9-positions, are prepared by condensation of a hydrazinoquinoline with a pyridinecarboxaldehyde. The compounds are used to combat tapeworm infections in animals.

This application is a division of copending application Ser. No. 859,593, filed Sept. 19, 1969, now U.S. Pat. 3,646,019.

This invention relates to chemical compounds having anticestode activity. In particular, the invention relates to 4-(heterocyclic aryl methylenehydrazino)quinolines.

The compounds of the invention are represented by the following structural formula:

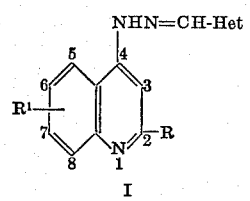

wherein:

Het is a heterocyclic group;
R is a hydrogen or a lower alkyl group; and
$R^1$ is hydrogen, lower alkyl, lower alkoxy, halo, or trifluoromethyl.

A preferred group of compounds is represented by Formula I when Het is a monocyclic heterocyclic aryl group consisting of pyridyl, furyl, or thienyl; R is lower alkyl of about 1 to 4 carbon atoms; and $R^1$ is lower alkyl of 1 to 4 carbon atoms or lower alkoxy of 1 to 4 carbon atoms. The pyridyl groups can be 2, 3, or 4-pyridyl and they may be substituted by a methyl group; the furyl or thienyl groups may be 2 or 3-furyl or thienyl.

Another preferred group of compounds is represented by Formula I when Het is 2-pyridyl, 3-pyridyl, 4-pyridyl, or 6-methyl-2-pyridyl; R is methyl; and $R^1$ is 6-methyl, 6-methoxy, 8-methyl, or 8-methoxy.

The term halo is intended to include fluoro, chloro, bromo, and iodo.

Among the preferred compounds are 2,6-dimethyl-4-(4-pyridylmethylenehydrazino)quinoline;
2,6-dimethyl-4-(3-pyridylmethylenehydrazino)quinoline;
2,6-dimethyl-4-(6-methyl-2-pyridylmethylenehydrazino)quinoline;
2-methyl-6-methoxy-4-(6-methyl-2-pyridylmethylenehydrazino)quinoline;
2-methyl-8-methoxy-4-(6-methyl-2-pyridylmethylenehydrazino)quinoline;
2-methyl-4-(6-methyl-2-pyridylmethylenehydrazino)quinoline;
2,8-dimethyl-4-(3-pyridylmethylenehydrazino)quinoline;
2,8-dimethyl-4-(2-pyridylmethylenehydrazino)quinoline;
2-methyl-6-methoxy-4-(4-pyridylmethylenehydrazino)quinoline;
2-methyl-6-methoxy-4-(2-pyridylmethylenehydrazino)quinoline;
2-methyl-8-methoxy-4-(2-pyridylmethylenehydrazino)quinoline;
2-methyl-4-(3-pyridylmethylenehydrazino)quinoline;
2,6-dimethyl-4-(2-pyridylmethylenehydrazino)quinoline; and
2-methyl-6-methoxy-4-(3-pyridylmethylenehydrazino)quinoline.

The compounds of the invention are prepared by reaction of a hydrazinoquinoline of Formula II with an aldehyde of Formula III; R, $R^1$, and Het are as defined above.

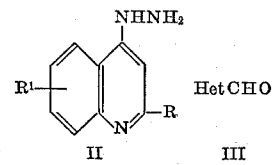

The reactants are dissolved in approximately equimolar amounts in an inert solvent such as ethanol, methanol, acetone, or other organic solvent. The reaction is facilitated by heating, preferably at steam bath temperature, for a period sufficient to complete the reaction. One hour is a convenient time, although somewhat shorter or longer periods may be used. The product is conveniently isolated by cooling the reaction mixture, adding water, and filtering off the resulting precipitate. The product is purified by recrystallization from ordinary solvents such as aqueous ethanol.

Alternatively, the hydrazinoquinoline reactant may be in the form of a salt such as the hydrochloride, in which case the reaction mixture will include a weakly basic material such as sodium acetate in order to release the free base for reaction.

The products, being basic, may be combined with pharmaceutically acceptable acids such as, but not being liimted to, hydrochloric, sulfuric, citric, tartaric, maleic, or nitric to form the corresponding acid addition salts. These salts are prepared in the conventional manner by combining the basic product with the acid, either or both of the compounds being in the form of their alcoholic or acetone solutions.

The compounds of the present invention may form hydrates when crystallized from a solvent containing water. They may be isolated, purified, and used as the hydrates, or, preferably, dehydrated by conventional drying and recrystallizing techniques well-known to the organic chemist.

The starting materials of the invention are known or are readily prepared by known processes. The hydrazinoquinolines are either known or are prepared by known methods such as by reacting the corresponding 4-chloroquinoline with hydrazine hydrate.

The compounds of the invention are anticestodes. They are active against tapeworm infections in animals, particularly those caused by *Hymenolepis nana*. They have been found to cause significant, in many cases complete, elimination of *H. nana* tapeworms from mice when administered orally at doses of 100–200 mg./kg. Exemplary of the compounds having such activity at such doses are 2,6-dimethyl-4-(4 - pyridylmethylenehydrazino)quinoline and 2,6-dimethyl - 4 - (3 - pyridylmethylenehydrazino) quinoline, which eliminate 100% of the *H. nana* tapeworms from infected mice when administered in oral doses of 200 mg./kg. once each day for three days. The compounds are formulated for use in infected or susceptible animals by combining them with conventional pharmaceutical excipients into tablets or capsules, and, for veterinary use, additionally including them in feed mixes.

The compounds of the invention also possess antibacterial and antifungal activity against such organisms as *S. aureus, S. faecalis, T. mentagrophytes, M. smegmatis, C. albicans, B. subtilis,* and *Mycoplasma salivarium.*

The following examples are intended to illustrate the preparation of the compounds of the invention, but are not to be construed as limiting the scope thereof. Temperatures given are in degrees centigrade. When hydrates are obtained, they are converted to their anhydrates by conventional drying and recrystallization procedures.

EXAMPLE 1

4-(2-pyridylmethylenehydrazino)quinoline

A solution of 2 g. of 4-hydrazinoquinoline and 1.346 g. of 2-pyridinecarboxaldehyde in ethanol is heated on the steam bath for an hour, cooled, and diluted with water. The resulting precipitated product is filtered off and recrystallized as the hydrate from aqueous ethanol; M.P. 135° (for the monohydrate); 202° (anhydrate).

The corresponding 3-pyridyl compound, M.P. 208° (hemihydrate), and 4-pyridyl compound, M.P. 205°, are prepared in the same manner.

EXAMPLE 2

When 2 g. of 4-hydrazinoquinoline and 1.522 g. of 6-methyl-2-pyridinecarboxaldehyde are allowed to react as in Example 1, 4-(6-methyl-2-pyridylmethylenehydrazino)quinoline, M.P. 209° (monohydrate), is obtained.

EXAMPLE 3

When 2 g. of 2-methyl-4-hydrazinoquinoline is allowed to react with 1.237 g. of 2, 3, or 4-pyridinecarboxaldehyde according to Example 1, 2-methyl-4-(2-pyridylmethylenehydrazino)quinoline, M.P. 110° (trihydrate), 190° (anhydrate); 2-methyl - 4 - (3 - pyridylmethylenehydrazino) quinoline, M.P. 194°; or 2-methyl-4-(4-pyridylmethylenehydrazino)quinoline, M.P. 196° (dihydrate) are obtained, respectively.

EXAMPLE 4

When 2 g. of 2-methyl-4-hydrazinoquinoline and 1.399 g. of 6-methyl-2-pyridinecarboxaldehyde are allowed to react as in Example 1, 2-methyl-4-(6-methyl-2-pyridylmethylenehydrazino)quinoline, M.P. 120° (dihydrate), 195° (anhydrate), is obtained.

EXAMPLE 5

When 2 g. of 2,6-dimethyl-4-hydrazinoquinoline and 1.44 g. of 2, 3, or 4-pyridinecarboxaldehyde are allowed to react as in Example 1, 2,6-dimethyl-4-(2-pyridylmethylenehydrazino)quinoline, M.P. 228° (trihydrate); 2,6-dimethyl-4-(3-pyridylmethylenehydrazino)quinoline, M.P. 245° (dihydrate); or 2,6-dimethyl-4-(4-pyridylmethylenehydrazino)quinoline, M.P. 230° (trihydrate), are obtained, respectively.

EXAMPLE 6

When 2 g. of 2,6-dimethyl-4-hydrazinoquinoline and 1.294 g. of 6-methyl-2-pyridinecarboxaldehyde are allowed to react as in Example 1, 2,6-dimethyl-4-(6-methyl-2-pyridylmethylenehydrazino)quinoline, M.P. 205°, is obtained.

EXAMPLE 7

When 2 g. of 2,8-dimethyl-4-hydrazinoquinoline and 1.144 g. of 2,3, or 4-pyridinecarboxaldehyde are allowed to react as in Example 1, 2,8-dimethyl-4-(2-pyridylmethylenehydrazino)quinoline, M.P. 225°; 2,8-dimethyl-4-(3-pyridylmethylenehydrazino)quinoline, M.P. 208°(hemihydrate); or 2,8-dimethyl-4-(4-pyridylmethylenehydrazino)quinoline, M.P 107° (dihydrate), are obtained, respectively.

EXAMPLE 8

When 2 g. of 2,8-dimethyl-4-hydrazinoquinoline and 1.294 g. of 6-methyl-2-pyridinecarboxaldehyde are allowed to react as in Example 1, 2,8-dimethyl-4-(6-methyl-2-pyridylmethylenehydrazino)quinoline, M.P. 192°, is obtained.

EXAMPLE 9

When 2 g. of 2-methyl-6-methoxy-4-hydrazinoquinoline and 1.054 g. of 2, 3, or 4-pyridinecarboxaldehyde are allowed to react as in Example 1, 2-methyl-6-methoxy-4-(2 - pyridylmethylenehydrazino)quinoline, M.P. 221°; 2-methyl-6-methoxy - 4 - (3 - pyridylmethylenehydrazino) quinoline, M.P. 252°; or 2-methyl-6-methoxy-4-(4-pyridylmethylenehydrazino)quinoline, M.P. 240°, are obtained, respectively.

EXAMPLE 10

When 2 g. of 2-methyl-6-methoxy-4-hydrazinoquinoline and 1.192 g. of 6-methyl-2-pyridinecarboxaldehyde are allowed to react as in Example 1, 2-methyl-6-methoxy-4-(6-methyl-2-pyridylmethylenehydrazino)quinoline, M.P. 224° (tetrahydrate), is obtained.

EXAMPLE 11

When 2 g. of 2-methyl-8-methoxy-4-hydrazinoquinoline and 1.054 g. of 2, 3, or 4-pyridinecarboxaldehyde are allowed to react as in Example 1, 2-methyl-8-methoxy-4-(2 - pyridylmethylenehydrazino)quinoline, M.P. 130° (monohydrate), 218° (anhydrate); 2-methyl-8-methoxy-4-(3-pyridylmethylenehydrazino)quinoline, M.P. 217°; or 2-methyl - 8 - methoxy-4-(4-pyridylmethylenehydrazino)-quinoline, M.P. 134° (hemihydrate), are obtained, respectively.

EXAMPLE 12

When 2 g. of 2-methyl-8-methoxy-4-hydrazinoquinoline and 1.192 g. of 6-methyl-2-pyridinecarboxaldehyde are allowed to react as in Example 1, 2-methyl-8-methoxy-4-(6-methyl-2-pyridylmethylenehydrazino)quinoline, M.P. 150° (monohydrate), 204° (anhydrate), is obtained.

EXAMPLE 13

When the following listed hydrazinoquinolines and heterocyclic carboxaldehydes are allowed to react as in Example 1, the listed products are obtained, respectively.

Hydrazinoquinoline 2-propyl-4-hydrazinoquinoline
2,5-diethyl-4-hydrazinoquinoline
2,7-dimethyl-4-hydrazinoquinoline
2-methyl-7-trifluoromethyl-4-hydrazinoquinoline
2-methyl-6-ethoxy-4-hydrazinoquinoline
2-methyl-8-methoxy-4-hydrazinoquinoline
2-methyl-6-propoxy-4-hydrazinoquinoline
2-methyl-6-methoxy-4-hydrazinoquinoline
2-methyl-6-fluoro-4-hydrazinoquinoline Heterocyclic carboxaldehyde thiophene-2-carboxaldehyde
thiophene-3-carboxaldehyde
furan-2-carboxaldehyde
furan-3-carboxaldehyde
thiophene-2-carboxaldehyde
furan-2-carboxaldehyde
pyridine-3-carboxaldehyde
thiophene-3-carboxaldehyde
furan-2-carboxaldehyde Product 2-propyl-4-(2-thenylidenehydrazino)quinoline
2,5-diethyl-4-(3-thenylidenehydrazino)quinoline
2,7-dimethyl-4-(2-furfurylidenehydrazino)quinoline
2-methyl-7-trifluoromethyl-4-(3-furfurylidenehydrazino)quinoline 2-methyl-6-ethoxy-4-(2-thenylidenehydrazino)-
  quinoline
2-methyl-8-methoxy-4-(2-furfurylidenehydrazino)-
  quinoline
2-methyl-6-propoxy-4-(3-pyridylmethylene-
  hydrazino)quinoline
2-methyl-6-methoxy-4-(3-thenylidenehydrazino)-
  quinoline
2-methyl-6-fluoro-4-(2-furfurylidenehydrazino)
  quinoline As exemplary of the method by which the starting 4-hydrazinoquinolines are prepared from 4-chloroquinolines, the following procedure is set forth:

2,6-dimethyl-4-hydrazinoquinoline 4-chloro-2,6-dimethylquinoline (10 g.) and 30 ml. of 85% hydrazine hydrate are boiled in absolute alcohol for about 8 hours on the steam bath. The mixture is cooled and the resulting precipitate of the title compound is filtered off and recrystallized from a solvent such as ethanol; M.P. 193°. The hydrochloride, prepared in the conventional manner, and crystallized from methanol, melts at 308° (dec.).

Other 4-hydrazinoquinolines are similarly prepared from the corresponding 4-chloro precursors.

We claim:

1. A method of combatting tapeworm infections caused by *Hymenolessis Nana* in animals comprising orally administering to an animal suffering from tapeworm infestation an anticestode-effective amount of a compound of the formula:

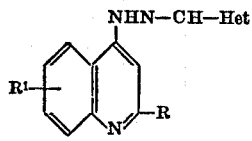

in which:
  Het is a pyridyl or methylpyridyl group;
  R is hydrogen or lower alkyl of 1 to 4 carbon atoms; and
  $R^1$ is hydrogen, lower alkyl of 1 to 4 carbon atoms, lower alkoxy of 1 to 4 carbon atoms, halo or trifluoromethyl.

2. The method of claim 1, in which Het is 2, 3 or 4-pyridyl or 6-methyl-2-pyridyl; R is methyl; and $R^1$ is at the 6 or 8-position and is methyl or methoxy.

3. The method of claim 2, wherein the compound is 2,6-dimethyl-4-(4-pyridylmethylenehydrazino)quinoline.

4. The method of claim 2, wherein the compound is 2,6-dimethyl-4-(3-pyridylmethylenehydrazino)quinoline.

5. The method of claim 2, wherein the compound is 2,6-dimethyl-4-(6 - methyl-2-pyridylmethylenehydrazino) quinoline.

6. The method of claim 2, wherein the compound is 2-methyl - 6 - methoxy - 4 - (6-methyl-2-pyridylmethylene-hydrazino)quinoline.

7. The method of claim 2, wherein the compound is 2 - methyl - 6 - methoxy-4-(2-pyridylmethylenehydrazino) quinoline.

8. The method of claim 2, wherein the compound is 2-methyl - 8 - methoxy-4-(6-methyl-2-pyridylmethylenehydrazino)quinoline.

9. The method of claim 2, wherein the compound is 2-methyl - 4 - (6-methyl - 2 - pyridylmethylenehydrazino) quinoline.

10. The method of claim 2, wherein the compound is 2,8-dimethyl-4-(3-pyridylmethylenehydrazino)quinoline.

References Cited
UNITED STATES PATENTS 3,579,520   5/1971   Bailey _____ 424—258
3,646,019   2/1972   Actor et al. _____ 260—240 G

OTHER REFERENCES

Chemical Abstracts, vol. 55 (1961), p. 10442–10443.

VINCENT D. TURNER, Primary Examiner